United States Patent [19]
Ozaki

[11] Patent Number: 5,455,601
[45] Date of Patent: Oct. 3, 1995

[54] METHOD OF AND APPARATUS FOR DISPLAYING IMAGE

[75] Inventor: Tohru Ozaki, Kawasaki, Japan

[73] Assignee: Fujitsu Limited, Kawasaki, Japan

[21] Appl. No.: 202,579

[22] Filed: Feb. 28, 1994

[30] Foreign Application Priority Data

Apr. 21, 1993 [JP] Japan .................................. 5-094537

[51] Int. Cl.⁶ .................................................. G09G 3/02
[52] U.S. Cl. ........................................... 345/156; 345/123
[58] Field of Search .................................. 345/157, 156, 345/123, 121, 146

[56] References Cited

U.S. PATENT DOCUMENTS

| 4,109,145 | 8/1978 | Graf ....................................... 345/146 |
| 4,891,630 | 1/1990 | Friedman ............................... 345/156 |

FOREIGN PATENT DOCUMENTS

| 60-218168 | 10/1985 | Japan . |
| 3-256112 | 11/1991 | Japan . |
| 4-100083 | 4/1992 | Japan . |
| 4-225478 | 8/1992 | Japan . |

*Primary Examiner*—Curtis Kuntz
*Assistant Examiner*—Minsun Oh
*Attorney, Agent, or Firm*—Staas & Halsey

[57] ABSTRACT

A display section displays an image to be displayed on a screen. An image processing section detects an opening/closing of an operator's eyelids on the basis of an image of the operator's face. A display controlling section changes the video data displayed on the display screen through a display section on the basis of the eyelid opening/closing state detected by the image processing section in accordance with a timing at which the operator does not look at the display screen.

30 Claims, 9 Drawing Sheets

METHOD OF AND APPARATUS FOR DISPLAYING IMAGE

BACKGROUND OF THE INVENTION

1. Field of the Invention

The present invention relates generally to a technology of displaying an image on a display unit of a terminal device of a computer system and, more particularly, to a method of and an apparatus for displaying the image to provide a viewer with an easy-to-see image display on a display screen.

2. Description of the Related Art

A conventional image display apparatus for displaying an image on a display unit in a computer system, a terminal device of the computer system or a terminal device of a computer-assisted system, for example, performs displaying in the following manner.

A video data generating section constructed by use of, e.g., a microprocessor unit generates video data to be displayed. The video data are temporarily written to a display video memory comprising of a RAM (Random Access Memory), viz., a V-RAM (Video RAM). The video data to be displayed are read out from the video memory in accordance with a predetermined timing. An image is displayed on a display unit. The image is also displayed on the display unit in accordance with the predetermined timing set beforehand in relation to, e.g., a characteristic of the display unit. In general, a state of a viewer, i.e., an operator is not almost taken into consideration.

On the other hand, there are circumstances when the operator does not use the terminal device, such as a keyboard, which operates an operating section for a predetermined time duration or longer. It is presumed that the operator leaves his or her seat while the terminal device is not actually employed. In such a case, if the image display through the image display apparatus is turned off, a futile consumption of the electric power can be reduced. Under such circumstances, some of the conventional image display apparatuses are constructed to stop displaying by the image display apparatus in teems of protecting, e.g., an environment. This involves detecting that, for instance, the keyboard in the terminal device is in an non-operative state for a duration of a predetermined time.

When the operator gazes at images of fine characters in the case of a text displayed on the screen, however, image scrolling or paging may be effected on the screen through operating. In this connection, if the display character image at which the operator gazes rapidly moves or changes on the screen due to, e.g., scrolling or paging, a hard-to-see state though instantaneous, is present each time. Repetitions of this state become one of the causes of eye fatigue. Further, the eye fatigue caused when this kind of repetition takes place many times frequently may induce a decline in eyesight of the operator. For example, an operator having a sound and normal eyesight may develop myopia or astigmatism. The myopia or astigmatism of the operator may get worse. Moreover, if the eyes are fatigued, as described above, the operator may suffer from a headache due to an eyestrain in some cases.

If the operator does not look at the display screen at a timing of scrolling or paging, it can be considered that the above eye fatigue is relieved. In actuality, however, it is quite difficult for the operator to deliberately close or turn the eyes away from the screen so as to seize the timing of scrolling or paging. This is, as a matter of fact, impossible.

SUMMARY OF THE INVENTION

It is a primary object of the present invention to provide a method of and an apparatus for displaying an image that are capable of properly controlling a timing of change of an image display in accordance with a state of an operator and thereby relieving an eye fatigue of the operator.

The image display apparatus according to this invention comprises an imaging section, an image processing section, a display control section and a display section.

The imaging section images the operator and takes image data of an operator's face into a system in real time. The image processing section analyzes the operator facial image data taken in by the imaging section and thus detects opening and closing of operator's eyelids. The display control section controls the display section for displaying an image to be displayed on a screen of the display section. At the same time, the display control section controls the display section to change the image on the display screen in accordance with eyelid opening/closing detected information outputted from the image processing section.

The imaging section can be constructed of, e.g., a TV camera and other real-time imaging devices. The display section can be constructed of a display device employing a CRT (Cathode Ray Tube), a liquid crystal display panel or another display element. The display control section includes a CPU (Central Processing Unit), e.g., a microprocessor, and controls the display section to display the image.

The imaging section supplies the image processing section with real-time video data of the operator's face with a repetition period well shorter than an eyelid-closed period. The image processing section detects the eyelid opening/closing in a period well shorter than the eyelid-closed period, e.g., blinking. This is done to enable the display control section to display the image on the screen and to change the displayed image within the eyelid-closed period, e.g., blinking.

The display control section may include, for instance, two units of image memories and a display processing circuit. The display processing circuit writes and reads the to-be-displayed video data to and from the image memories. The display processing circuit, when receiving a rewrite command signal, rewrites the video data in one of the two video memories. Thereafter, the display processing circuit changes over the video data employed for the display from the other video memory of the two video memories to one video memory described above within the eyelid-closed period. The rewritten video data are supplied to the display section from one video memory stated above.

The display processing circuit, when rewriting the displayed video data on the whole screen, supplies the display section with the rewritten displayed video data within the eyelid-closed period after finishing the rewrite to the above video memory. In the case of rewriting a part of the video data on the display screen, the display processing circuit outputs, after finishing the rewrite to the video memory, the rewritten displayed video data to the display section irrespective of the eyelid-opening/closing. This is done because the partial change on the screen exerts no large influence on the eye fatigue of the operator.

The image processing section may include an edge extracting section for extracting edge portions of the facial image of the operator and thus generating an edge image.

The image processing section may further include an image cutout section and a blink detecting section. The image cutout section cuts out video data of an area inclusive of at least an eye from the facial video data of the operator. The image cutout section supplies the edge extracting section with the cut-out video data. The blink detecting section detects a shape and a size of the eye from the edge image of the eye-part area, thereby detecting the opening/closing of the eyelids.

On the contrary, as a matter of course, an edge image of the whole face can be obtained by effecting the edge extraction prior to cutting out the video data of the eye-part area. Thereafter, in this case, the video data of the eye-part area may be cut out for use with a detection of blinking.

The edge extracting section may be, for example, a spatial filter for extracting edges by performing a differential process on the video data. This spatial filter has filter (matrix) coefficients of e.g, an N×N window. The spatial filter performs two-dimensional differential processes in X- and Y-directions by calculating the filter coefficients with respect to a region; i.e., window, of N×N pixels. The edge extraction may be executed with the aid of other spatial filtering processes or spatial differential processes.

The image processing section may be constructed to recognize the eyelid opening/closing at a high speed by use of, e.g., two units of video memories. This done by effecting the reading from the other video memory while writing the edge image of the operator's face to one video memory.

The image processing section may comprise one video memory for intermittently storing the facial edge image with a quite short period as done at, e.g, one-field or one-frame intervals. The image processing section may also comprise a processor for recognizing the eyelid opening/closing by reading the edge image from that video memory.

In the image display apparatus according to the present invention, the eyelid opening and closing are detected based on the real-time image of the operator's face. The displayed video data on the screen of the display section is changed during an eyelid-closed state of the operator based on the eyelid opening/closing detected information. Since the displayed image is changed during an eyelid-closed state in the image display apparatus, the eye fatigue of the operator is relieved.

That is, the eye fatigue of the operator can be relieved by changing the displayed image as done by scrolling or paging on the screen when the operator does not look at the screen.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will hereinafter be described with reference to the drawings.

First Embodiment

Figure 1:
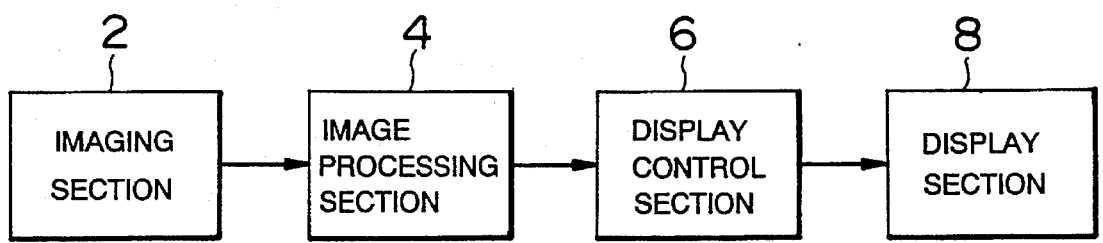
FIG. 1 is a block diagram illustrating a construction of an image display apparatus in a first embodiment of the present invention.

FIG. 1 illustrates a construction of an image display apparatus in principle in accordance with a first embodiment of the present invention.

The image display apparatus shown in FIG. 1 includes an imaging section 2, an image processing section 4, a display control section 6 and a display section 8.

The imaging section is, e.g., a TV camera. The imaging section 2 images a facial part of an operator and generates video data of the operator's face in real time. The image processing section 4 detects the opening and closing of an operator's eyelids on the basis of the operator's face image supplied from the imaging section 2. The display section 8 is a display device using, e.g., a CRT or a liquid crystal panel. The display section 8 displays the video data on a screen thereof. The display control section 6 has, for instance, a microprocessor-based CPU. The display control section 6 performs control of the display section for displaying the image to be displayed on the screen of the display section. The display control section 6 simultaneously changes the video data displayed on the display screen of the display section 8 by controlling the display section 8 on the basis of detected information on opening/closing of the eyelids, the information being output from the image processing section 4.

Figure 2:
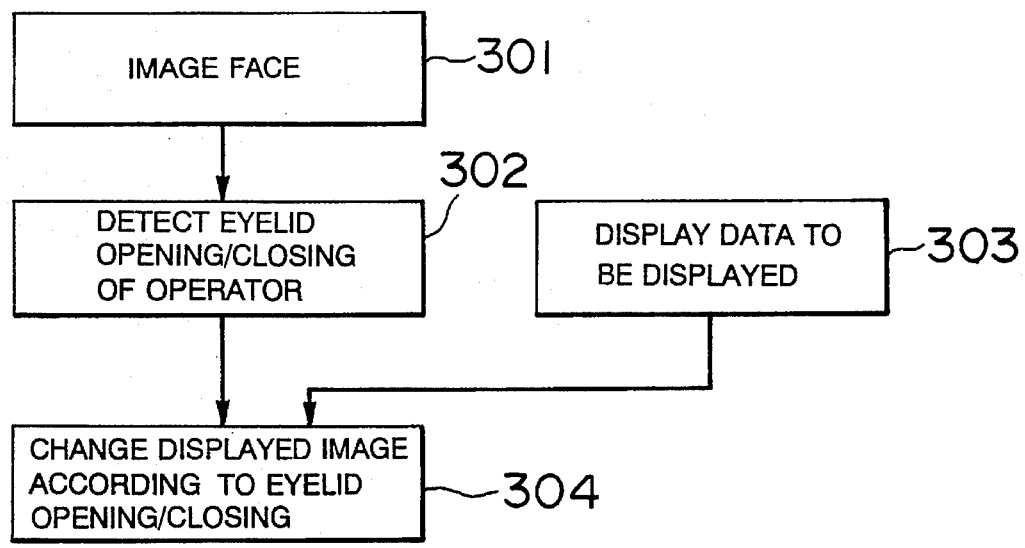
FIG. 2 is an explanatory flowchart showing operations of the apparatus of FIG. 1.

FIG. 2 is a flowchart showing operations of the image display apparatus of FIG. 1. Image display processing is performed in each of the following steps.

Step 301

The image of the operator's face is taken in by means of the imaging section 2.

Step 302

Based on the facial image taken in, the image processing section 4 detects the opening/closing of the eyelids.

Step 303

The display control section 6 controls the display section 8 to display the video data to be displayed on the screen.

Step 304

The display control section 6 changes the video data displayed on the screen by controlling the display section 8 on the basis of the opening/closing information of the eyelids which is detected by the image processing section 4 in step 302.

The imaging section 2 supplies the image processing section 4 with the real-time video data of the operator's face with a repetition period well shorter than a period for which the eyelids are closed. The image processing section 4 sequentially detects the opening/closing of the eyelids in a period well shorter than the eyelid-closed period. With this processing, the display control section 6 is capable of displaying the image on the screen and changing the displayed image within the eyelid-closed period, e.g., blinking.

As explained above, in the image display apparatus of FIG. 1, first in step 301, the video data of the operator's face is taken in. The opening and closing of the eyelids are detected from the facial video data in step 302. Further, in step 303, the video data is displayed on the screen. Then, in step 304, the video data on the screen is changed corresponding to the opening/closing detected in step 302.

More specifically, because a change of the displayed image as done by paging or scrolling on the screen is effected while the operator does not look at the screen, an eye fatigue of the operator can be relieved. In general, the blinking is performed once in 3 sec. An eyelid-closed period is 0.1 sec or longer, and, therefore, the displayed image can be changed enough only in the eyelid-closed period. Even if the changes of all the displayed images are not conducted for in the eyelid-closed duration of the operator, changing the displayed image in the eyelid-closed period of the operator is effective in reducing the operator's eye fatigue.

Second Embodiment

Figure 3:
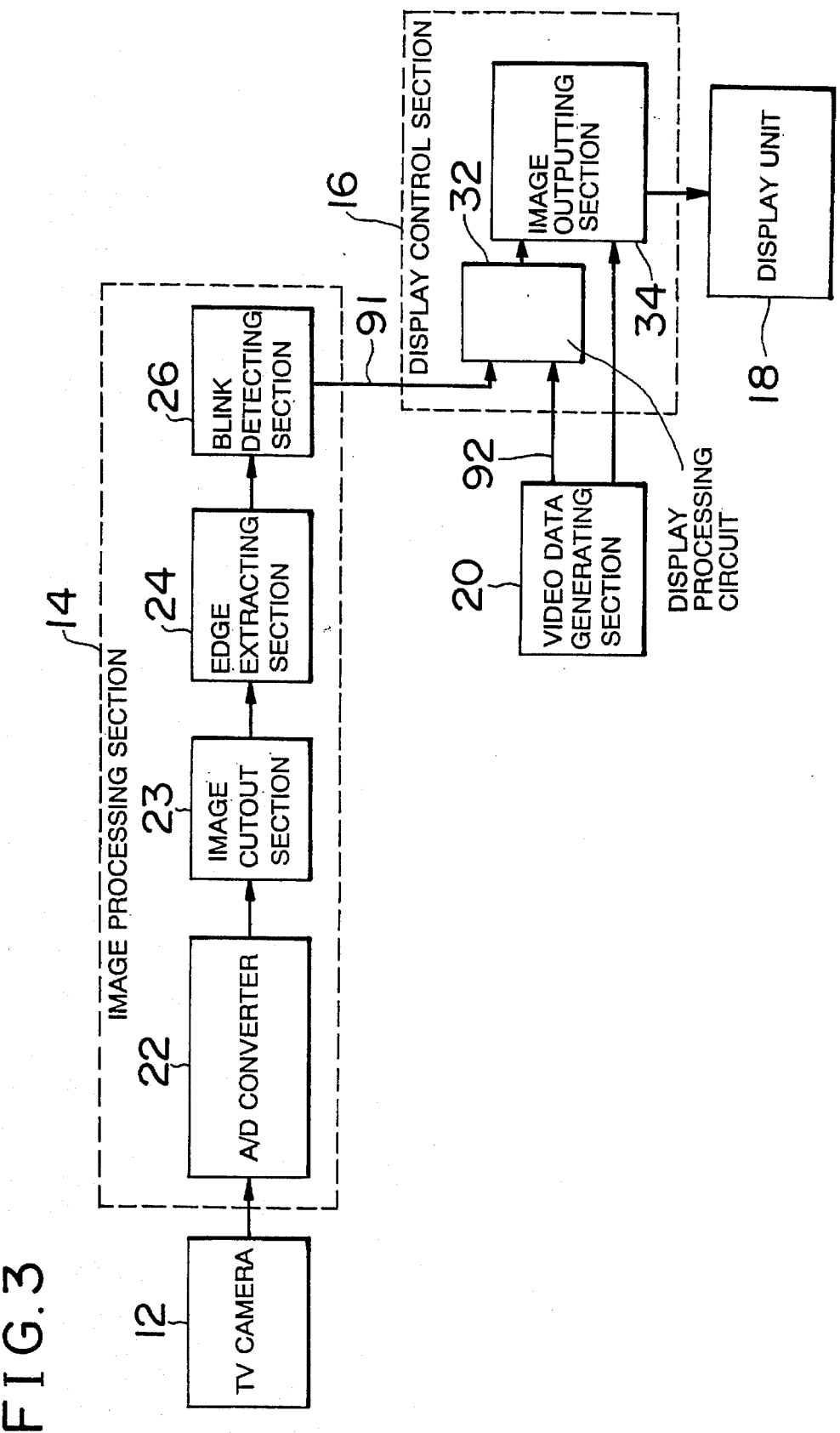
FIG. 3 is a block diagram illustrating a construction of the image display apparatus in a second embodiment of this invention.

FIG. 3 illustrates a construction of the image display apparatus in a second embodiment of this invention.

Construction of Second Embodiment

The image display apparatus of FIG. 3 comprises a TV camera 12, an image processing section 14, a display control section 16, a display unit 18 and a video data generating section 20.

The TV camera 12 constitutes an imaging section. The TV camera 12 generates a video signal of the facial image by imaging the facial part of the operator in real time. The video signal obtained by this TV camera is supplied to the image processing section 14.

The image processing section 14 processes the video signal supplied from the TV camera 12 in real time in accordance with, e.g., a frame rate of the video signal. The image processing section 14 is, in this case, constructed of an A/D (analog-to-digital) converter 22, an image cutout section 23, an edge extracting section 24 and a blink detecting section 26.

The A/D converter 22 converts the analog video signal supplied from the TV camera 12 into digital video data. The video data digitized by the A/D converter 22 is supplied to the image cutout section 23. The image cutout section 23 cuts out the video data of a segmented area corresponding to an eye part inclusive of a pupil, an iris and the eyelids from the facial video data. The eye-part video data cut out by the image cutout section 23 are supplied to the edge extracting section 24.

The edge extracting section 24 obtains an image formed of the edge portions by an edge extracting process from the eye-part digital video data outputted from the image cutout section 23. Processing by this edge extracting section 24 is also performed to keep, the frame rate of the video signal.

Figure 4:
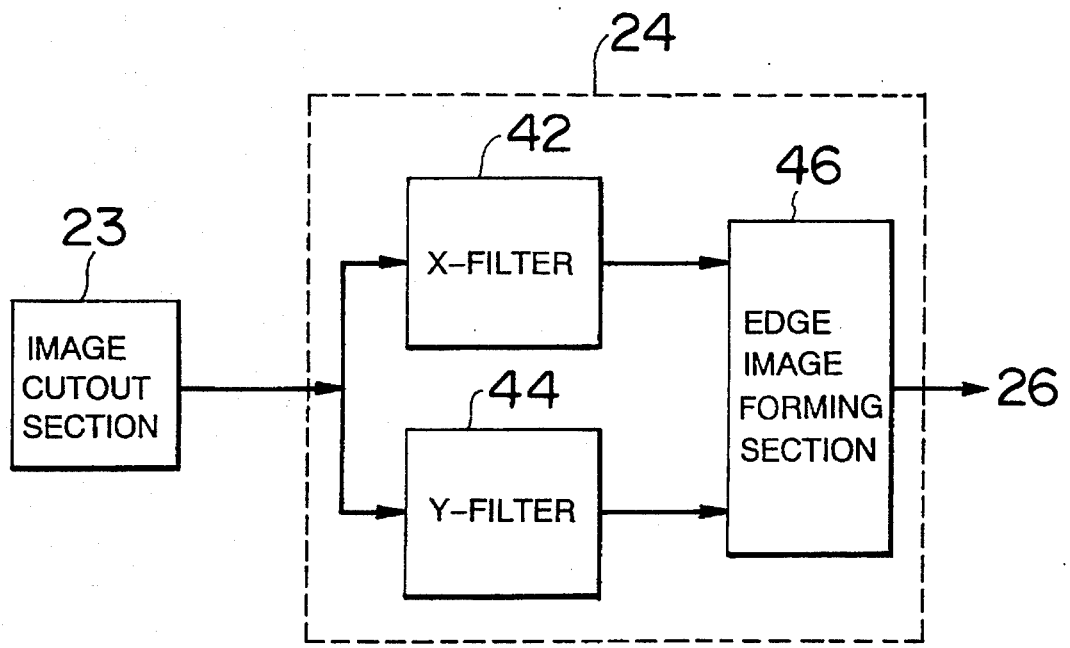
FIG. 4 is a block diagram showing a detailed configuration of an edge extracting section in the apparatus of FIG. 3.

FIG. 4 shows a detailed configuration of the edge extracting section 24.

The edge extracting section 24 of FIG. 4 is constructed of an X-spatial filter 42, a Y-spatial filter 44 and an edge image forming section 46.

The X-spatial filter 42 effects a Y-directional differential process on the eye-part digital video data outputted from the image cutout section 23, thereby extracting edge components in an X-direction. The Y-spatial filter 44 effects the X-directional differential process on the eye-part video data, thereby extracting the edge components in the Y-direction.

Figure 5:
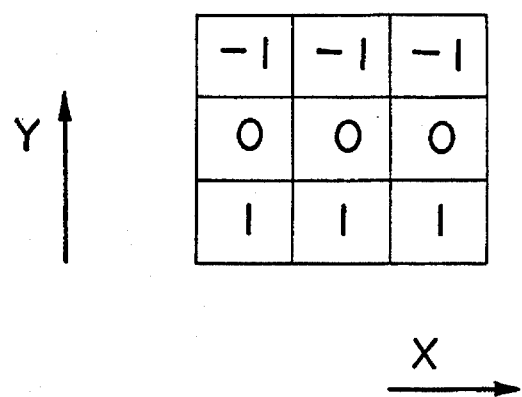
FIG. 5 is an explanatory diagram of filter coefficients of an X-spatial filter of the edge extracting section of FIG. 4.
Figure 6:
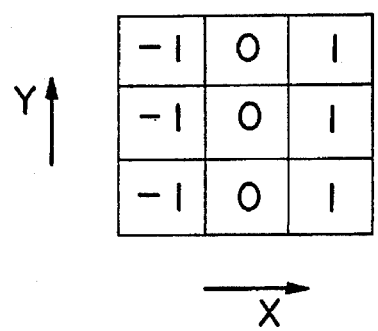
FIG. 6 is an explanatory diagram of filter coefficients of a Y-spatial filter of the edge extracting section of FIG. 4.

FIGS. 5 and 6 respectively illustrate examples of filter matrices of the X-spatial filter 42 and the Y-spatial filter 44, respectively.

These spatial filters 42 and 44 each perform a spatial filtering operation through a matrix consisting of nine filter coefficients of a 3'3 window with respect to pixels configuring the digital video data. In this case, the window matrix is composed of the filter coefficients which take one value among "−1", "0" and "1". The filter matrix of the X-spatial filter 42 takes the same filter coefficient per row in the X-direction. All the filter coefficients of the first row take "−1". All these coefficients of the second row take "0", and those of the third row take "1". The X-spatial filter 42 using the thus arranged matrix substantially performs the space differential in the Y-direction, thereby taking out the edge components in the X-direction. Y-spatial filter 44 takes the same filter coefficient per column in the Y-direction. All the filter coefficients of the first column take "−1". All these coefficients of the second column take "0", and those of the third column take "1". The Y-spatial filter 44 using the thus arranged matrix substantially performs the space differential in the X-direction, thereby taking out the edge components in the Y-direction.

The edge image forming section 46 is supplied with results of filtering by the X- and Y-spatial filters 42 and 44. The edge image forming section 46 has a data conversion table for effecting a threshold value process. The edge image forming section 46 fetches only the pixels having pixel values greater than a threshold value among the pixel values configuring edge video data in the X- and Y-directions that are supplied from the spatial filters 42 and 43. The edge image forming section 46 synthesizes these two-directional pixels, thus forming an edge image. An output from this edge image is supplied to the blink detecting section 26. The blink detecting section 26 detects the iris out of the edge image including the pupil, the iris and the eyelids, which has been output from the edge image forming section 46. The blink detecting section 26 detects and recognizes a blink opening/closing state from a size of this iris. Note that what is done is in short detecting the opening/closing of the eyelids, and hence a size of the pupil or an eyeball between the upper and lower eyelids may be detected in place of the iris.

Figure 7:
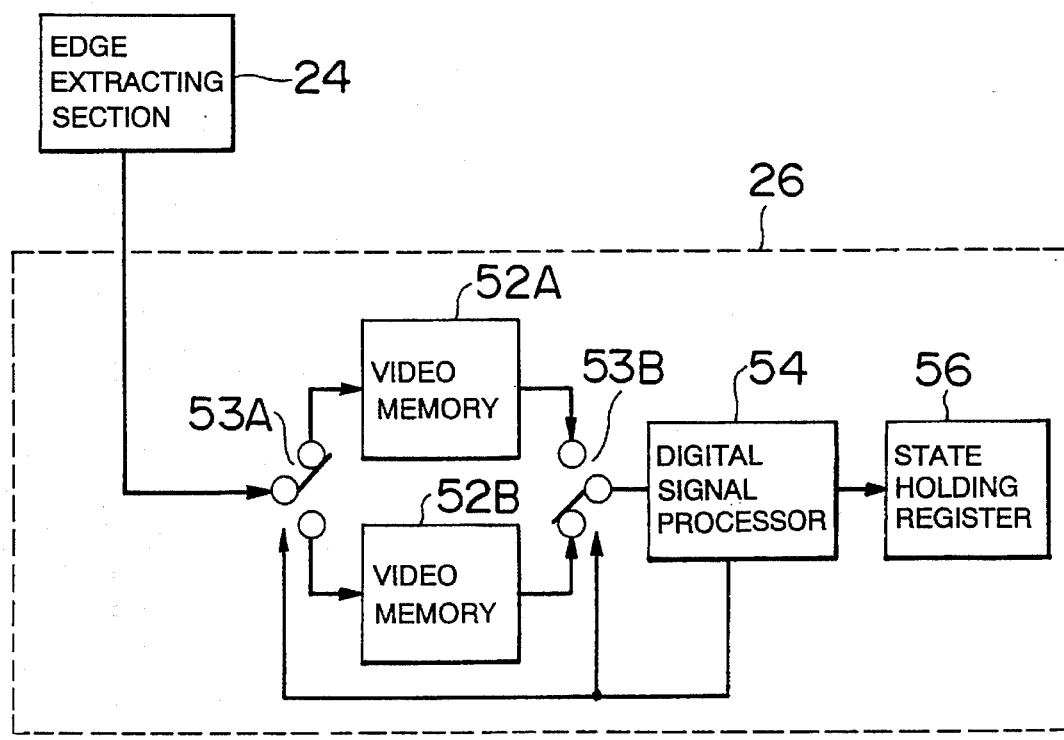
FIG. 7 is a block diagram showing a detailed configuration of a blink detecting section in the apparatus of FIG. 3.

FIG. 7 shows one specific example of the blink detecting section 26.

The blink detecting section 26 illustrated in FIG. 7 comprises video memories 52A, 52B, switch circuits 53A, 53B, a DSP (Digital Signal Processor) 54 and a state holding register 56.

The switch circuits 53A and 53B synchronize and operate on opposite sides to each other, thus switching over the video memories 52A and 52B. For instance, when the switch circuit 53A selects the video memory 52A, the switch circuit 53B selects the video memory 52B. With the action of the switch circuit 53A, the video memories 52A and 52B alternately store the edge images supplied from the edge extracting section 24.

The DSP 54 controls the switch circuits 53A and 53B to operate as described above. The DSP 54 reads the edge image from the video memory 52B when writing the edge image to, e.g., the video memory 52A.

Based on the edge image read through the switch circuit 53B, the DSP 54 detects the edge image shaping a substantially circular closed loop as a outline of the iris with respect to the edge image inclusive of the pupil, the iris and the eyelids. The DSP 54 further determines the opening/closing state of the eyelids from a size of this iris outline. The state holding register 56 stores a thus determined result.

The display control section 16 receives an output of the blink detecting section 26 of the image processing section 14 and an output of the image generating section 20. The display control section 16 causes the display unit 18 to display the image based on the output video data of the image generating section 20. At the same time, the display control section 16 changes the video data displayed thereon on the basis of the output of the blink detecting section 26.

The display control section 16 includes a display processing circuit 32 and an image output circuit 34.

The display processing circuit 32 receives an opening/closing state signal 91 defined as a detected result of the opening/closing of the eyelids from the blink detecting section 26. The display processing circuit 32 is also supplied with a rewrite signal 92 from the image generating section 20. The rewrite signal 92 indicates a rewrite of the whole screen or a part (one character) thereof as done by scrolling or paging. The rewrite signal 92 is also a signal for indicating an end of rewrite when rewriting at least the whole screen.

The display processing circuit 32 operates based on these signals 91 and 92. In the case of rewriting the whole screen, the display processing circuit 32, after obtaining the rewrite signal 92 showing the end of write to the video memory, changes an output from, e.g., "0" to "1" immediately after reaching a closed state of the eyelids or a substantially-closed state thereof.

The image output circuit 34 outputs, to the display unit 18, display data outputted from the image generating section 20 in accordance with the output of the display processing circuit 32.

Figure 8:
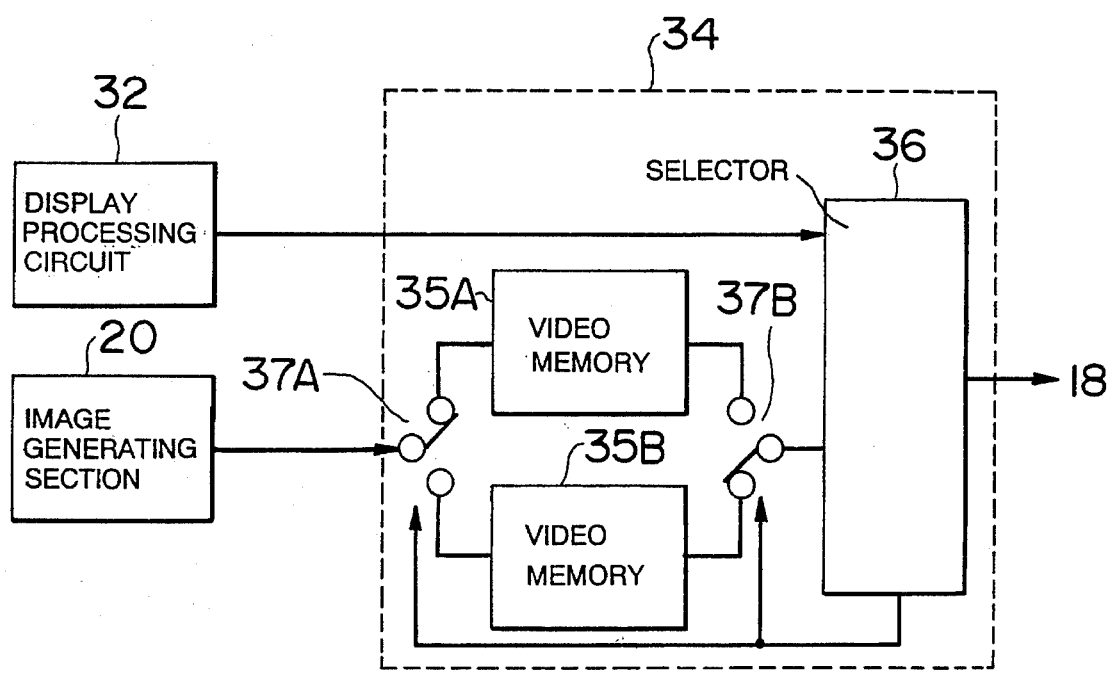
FIG. 8 is a block diagram showing a detailed configuration of an image outputting section in the apparatus of FIG. 3.

FIG. 8 illustrates a detailed configuration of the image output circuit 34.

The image output circuit 34 of FIG. 8 is constructed of display memories 35A, 35B, switch circuits 37A, 37B and a selector 36.

The display memories 35A and 35B alternately store the video data to be displayed. That is, the to-be-displayed video data outputted from the image generating section 20 are written alternately to the display memories 35A and 35B. The video data, which are to be employed as display data outputted to the display unit 18, are also read alternately from a not-in-writing-process memory of the display memories 35A and 35B.

The selector 36 alternately uses the display memories 35A and 35B on the basis of an output from the display processing circuit 32. The selector 36 therefore switches over the switch circuits 37A and 37B to the opposite sides to each other in synchronism. The display unit 18 is supplied with and made to display the video data read from the display memory 35A or 35B selected by the switch circuit 37B.

Processing of Second Embodiment

Figure 9:
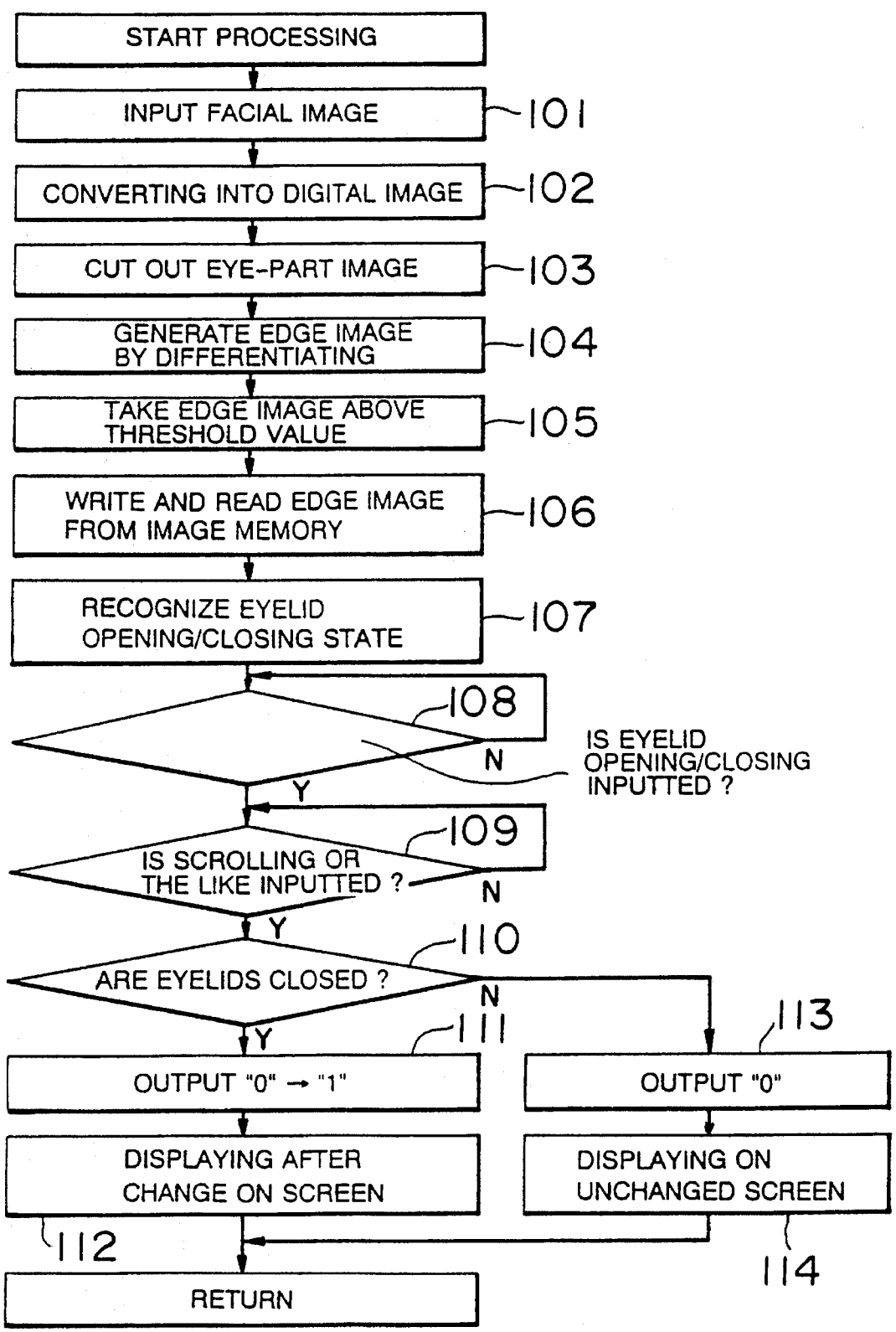
FIG. 9 is an explanatory flowchart showing operations of the apparatus of FIG. 3.

FIG. 9 is a flowchart illustrating processing by the image display apparatus in a second embodiment, shown in FIGS. 3, 4, 7 and 8, of the present invention. FIGS. 10A–10D show images obtained in some steps of FIG. 9.

Referring to FIG. 9, an image displaying process will be explained.

Figure 10A:
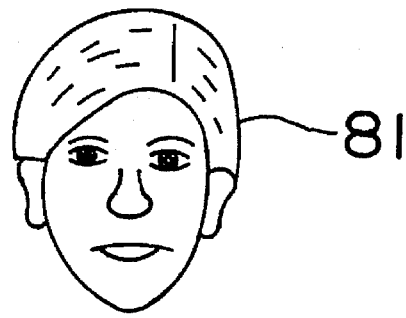
FIGS. 10A, 10B, 10C and 10D are diagrams schematically illustrating a facial image, an eye-part image, an eye-part edge image and an iris-part edge image, respectively, which are obtained at respective stages in the course of detecting an eyelid opening/closing state from a facial image of an operator.

To start with, a video signal of an image 81 of the operator's face as shown in FIG. 10A is input to the image processing section 14 from the TV camera 12 (step 101).

Next, the A/D converter 22 of the image processing section 14 converts the facial video signal into video data (step 102). Herein, a frame repetitive period is well shorter than the eyelid-closed period according to a frame rate of the video signal supplied from the TV camera 12. In a normal case, the eyelid-closed period is 0.1 sec or longer. The frame repetitive period of the video signal in a typical TV (NTSC) system is 1/30 sec.

One field in an interlace system is herein treated as one image, i.e., one frame for image processing as done in, e.g., a TV system. In this instance, the digital video data is supplied directly to the image cutout section 23. Note that when one frame consisting of two fields in the interlace system is treated as one frame for the image processing, the video data is, after being switched over to a non-interlace system from the interlace system, supplied to the image cutout section 23.

This image processing section 14 performs processing in real time in accordance with, e.g., a frame rate of the video signal. The image processing section 14 therefore processes the digital image in a period well shorter than the eyelid-closed period.

Figure 10B:

The image cutout section 23 cuts out an image 82 of a segmented area of the eye part including the pupil, the iris and the eyelids as shown in FIG. 10B from the digital video data of the operator's face (step 103). The image cutout section 23 then supplies the image 82 to the edge extracting section 24. Image information supplied from the TV camera 12 is continuous. The video data of the segmented area of the eye part can be easily cut out by utilizing, as a template, the eye-part segmented area based on processing of a preceding frame, e.g., a just-before frame.

Figure 10C:
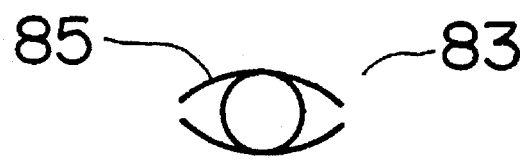

The edge extracting section 24 effects the differential process on the eye-part video data supplied from the image cutout section 23 by use of the filter coefficients of a 3×3 window of the X-spatial filter 42. The edge extracting section 24 thereby extracts the X-directional edge components. The eye-part video data further undergo the differential process by using the filter coefficients of a 3×3 window of the Y-spatial filter 44. The Y-directional edge components are thereby extracted. Images composed of these X- and Y-directional edge components are synthesized by the edge image forming section 46, thereby obtaining an eye-part edge image 83 as shown in FIG. 10C (step 104).

Referring now to FIGS. 11A–11D, a concept of the edge extracting process used in this embodiment will be explained.

Nine pixel values corresponding in terms of position to each other about a target pixel are multiplied by the above-mentioned nine filter coefficients of a 3×3 window. A total sum of these multiplied pixel values is set as a pixel value of the target pixel. Such processing is performed on each of the pixels of the video data of the eye-part segmented area.

Figure 11A:
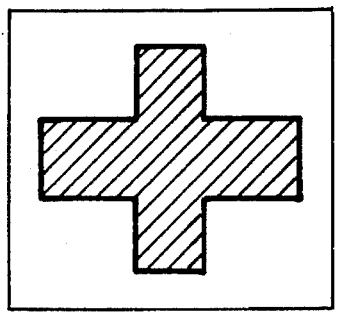
FIGS. 11A, 11B, 11C and 11D are diagrams schematically illustrating an image of an original graphic, an X-filtered image, a Y-filtered image and an edge image to be extracted, respectively, which are obtained at respective stages in the course of an edge extracting process.
Figure 11B:
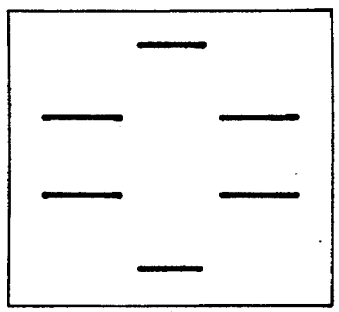
Figure 11C:
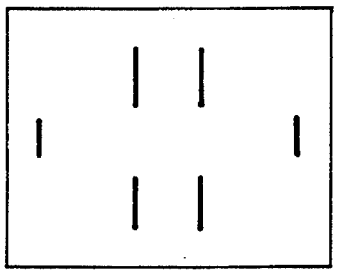
Figure 11D:
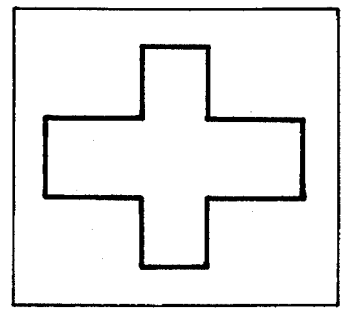

FIG. 11A illustrates a target digital image. FIG. 11B shows an X-edge image composed of X-directional edge components obtained by effecting the Y-directional differential process on the image shown in FIG. 11A. FIG. 11C depicts a Y-edge image composed of Y-directional edge components obtained by effecting the X-directional differential process on the image shown in FIG. 11A. FIG. 11D illustrates an edge image obtained by synthesizing these X- and Y-edge images.

The eye-part edge image 83 shown in FIG. 10 is obtained by the above-described edge extracting process. Note that the edge image forming section 46 restrains, as a minimum value, e.g., "0", a pixel value less than a predetermined threshold value among the pixel values of the pixels which form the edge image 83 of the eye-part area, thereby obtaining an edge image in which only sharp edges are enhanced by use of only the pixels having their values larger than the threshold value. The edge image described above is supplied as an eye-part edge image to the blink detecting section 26 (step 105).

The DSP 54 causes the switch circuits 53A and 53B to operate alternately. The facial edge image is thereby written to one of the video memories 52A and 52B from the edge extracting section 24. Besides, during this writing process, the edge image is read from the other of the video memories 52A and 52B and taken in the DSP 54 (step 106).

Figure 10D:

Then, the DSP 54 detects an iris 84 shown in FIG. 10D in the eye-part edge image 83 supplied from the edge image forming section 46. The DSP 54 determines the opening/closing state of eyelids 85 of FIG. 10C from a size of this iris part. The opening/closing information of the eyelids 85 is stored in the state holding register 56 (step 107). That is, the DSP 54 detects a closed loop in the form of an outline of the iris in the edge image including the pupil, the iris and the eyelids. Normally, the eyelid edge image partly has a break at an edge portion, i.e., the outer corner of the eye. It is therefore possible to easily detect the eyelids by detecting the closed loop. The opening/closing information of the eyelids may be classified into, e.g., three items of information, indicating a completely-opened state of the eyelid, a closed state of the eyelids and a half-opened state of the eyelids.

As discussed above, the DSP 54 determines the opening/closing of the eyelids. This involves reading the edge image of the face from the video memory 52B when, for example, the eye-part edge image has been written to the video memory 52A. At the next point of time, the DSP 54 makes an arrangement so that, the above edge image is to be written to the video memory 52B. The DSP 54 then determines the opening/closing of the eyelids by reading the above edge image from the video memory 52A. That is, the opening/closing states of the eyelids are sequentially output by alternately employing the two video memories 52A and 52B.

In this way, the edge image given at the frame rate of the video signal is alternately read and written by use of the video memories 52A and 52B. Processing of the DSP 54 can be thus continuously executed at the above frame rate. The edge image output from the edge extracting section 24 can be thus processed surely in real time with a predetermined period.

Next, the display processing circuit 32 determines whether or not the opening/closing state signal 91 defined as a piece of eyelid opening/closing information is input from the blink detecting section 26 (step 108). If the eyelid opening/closing state signal 91 is not input, there is a wait till the signal 91 is input.

Further, the display processing circuit 32 determines whether or not the rewrite signal 92 is input from the image generating section 20 (step 109). The rewrite signal 92 indicates a rewrite of the whole screen or a part (e.g., one character) thereof as done by scrolling or paging. The rewrite signal 92 also indicates whether or not the rewrite is ended in the case of rewriting the whole screen. If the rewrite signal is not input, there is a waiting period till this signal is input.

Subsequently, the display processing circuit 32, when rewriting the whole screen in response to the write signal 92, determines whether or not the eyelids are in a substantially-closed state (more specifically, a closed state or an on-the-verge-of-being-closed state) (step 110).

Herein, when the eyelids are in the substantially-closed state, the display processing circuit 32 changes the output from, e.g., "0" to "1" immediately thereafter (step 111).

Note that the output is changed from "0" to "1" just after finishing the write to the video memory 35A or 35B irrespective of the opening/closing state of the eyelids in the case of rewriting a part of the screen.

The image output circuit 34 causes the display unit 18 to display a change on the screen (step 112). This is done based on the to-be-changed-displayed video data (which has already been transferred to the video memory 35A or 35B) outputted from the image generating section 20 in accordance with the output "1" indicating that an image change given from the display processing circuit 32 (e.g., the fact of the eyelids being closed) is permitted. As already stated, generally, blinking is performed once in approximately 3 sec. The eyelid-closed period is 0.1 sec or longer. The change on the screen is carried out in this eyelid-closed period. Note that the above outputs "1" and "0" may be, as a matter of course, employed reversely.

On the other hand, in the eyelid-opened state, the display processing circuit 32 does not change the output "0" but holds the output as it is (step 113). The image output circuit 34 causes the display unit 18 to continuously display the previous image without any change on the screen with respect to the to-be-displayed video data outputted from the image generating section 20 in accordance with the output "0" indicating that an image change from the display processing circuit 32 is held over (step 114).

In this manner, the change of the displayed image on the screen as done by scrolling or paging is conducted while the operator does not gaze at the screen. The eye fatigue is therefore relieved.

Third Embodiment

Figure 12:
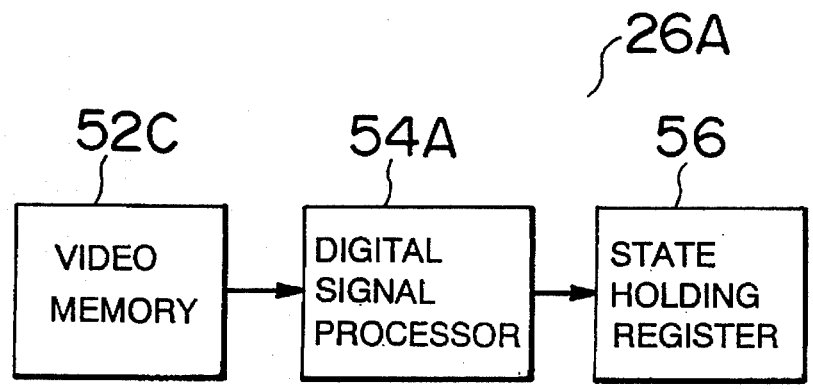
FIG. 12 is a block diagram showing a configuration of the blink detecting section of the image display apparatus in a third embodiment of this invention.

The image display apparatus in a third embodiment of this invention involves the use of a blink detecting section having a configuration different from that in the embodiments discussed above. FIG. 12 illustrates the configuration of the blink detecting section in this case.

Construction of Third Embodiment

A blink detecting section 26A of FIG. 12 comprises a video memory 52C, a DSP 54A and a state holding register 56. In this instance, unlike the blink detecting section 26 of FIG. 7, the blink detecting section 26A employs the single video memory 52C. The DSP 54A therefore performs processing by sequentially reading the video data from the video memory 52C. The state holding register 56 is the same as that of FIG. 7.

The video memory 52C of the .blink detecting section 26A stores the edge video data supplied from the edge extracting section 24 at one-frame intervals (corresponding to, i.e., one-frame or one-field intervals in the interlace video signals).

The DSP 54A sequentially reads the edge images written to the video memory 52C and executes the same process as the above-mentioned. The DSP 54A thereby determines the eyelid opening/closing state. The state holding register 56 then stores the opening/closing information.

Figure 13:
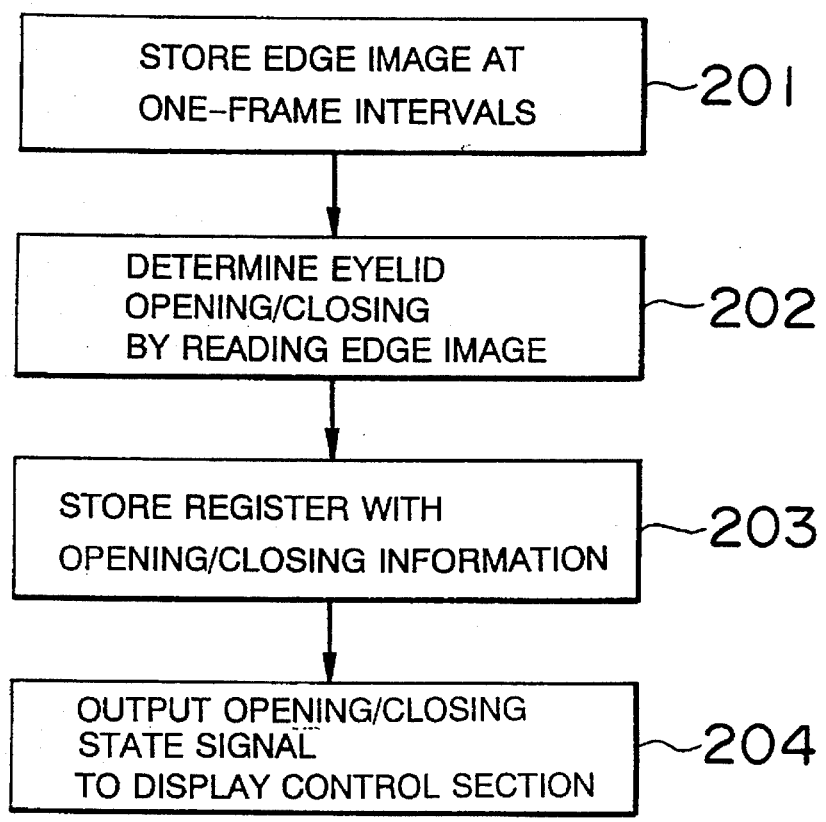
FIG. 13 is an explanatory flowchart showing operations of the blink detecting section of FIG. 12.

FIG. 13 is a flowchart showing processing by the blink detecting section in the third embodiment.

To begin with, the video memory 52C stores the edge images from the edge extracting section 24 at the one-frame intervals (step 201). Those edge images are stored at the one-frame intervals in such a manner that, for instance, the edge extracting section 24 extracts only the edge images beforehand at the one-frame intervals. Next, the DSP 54A sequentially reads the edge images at the one-frame intervals from the video memory 52C. The DSP 54A thereby determines the opening/closing of the eyelids (step 202). The DSP 54A makes the state holding register 56 store the opening/closing information based on a determined result of the eyelid opening/closing (step 203). Then, the eyelid opening/closing information is output to the display processing circuit 32 of the display control section 16 (step 204).

As described above, even when using the single video memory 52C, the same process as that of FIG. 7 can be effected by processing at the one-frame intervals. Particularly, when the processing is effected at the one-frame intervals in the previous video signals, there is nothing different except that the video data become coarse. This is substantially the same as performing the continuous processing. Accordingly, the single video memory may suffice, with the result that the construction is simplified.

In the image display apparatus of this invention, the eyelid opening/closing state is detected from the image of the operator's face. The change of the video data on the screen is performed based on the eyelid opening/closing state. In this way, the change on the screen is effected as done by scrolling or paging when the operator does not gaze at the screen as in the case of the eyes being closed, e.g., blinking. The eye fatigue of the operator is thereby relieved.

It is apparent that, in this invention, a wide range of different working modes can be formed based on the invention without deviating from the spirit and scope of the invention. This invention is not restricted by its specific working modes, except being limited by the appended claims.

What is claimed is:

1. A method of displaying an image formed by video data on a screen and viewed by an operator, said method comprising:

a displaying step of sequentially displaying the video data on the screen;

an image inputting step of inputting facial image information indicative of information of a face of the operator;

an image processing step of detecting opening and closing of eyelids of the operator based on the image information of the face;

a signal generating step of generating a rewrite signal indicative of rewriting the video data displayed on the screen; and a display controlling step of performing a principal change of the video data displayed on the screen when the rewrite signal is generated in said signal generating step and when the operator fails to look at the screen on the basis of the eyelid opening/closing state obtained by said image processing step.

2. The method according to claim 1, wherein:

said image inputting step comprises a step of inputting the facial image information in a period at least as short as a period for which the eyelids are closed by blinking; and said image processing step comprises a step of detecting the opening and closing of the eyelids in a period at least as short as the eyelid-closed period.

3. The method according to claim 1, wherein said display controlling step comprises a step of rewriting the displayed video data in a substantially-closed state of the eyelids of the operator.

4. The method according to claim 1, wherein said display controlling step comprises a step of rewriting the displayed video data at a proper timing by alternately writing change video data, which is the video data to replace the video data displayed on the screen, in two video memories and reading to-be-displayed video data, which is the change video data already written in the two video memories, from one of the two video memories different from the other one of the two video memories into which the change video data is written.

5. The method according to claim 4, wherein said display controlling step further comprises a step of reading the to-be-displayed video data from the one of the two video memories to the screen for display during an eyelid-closed state only when rewriting the whole screen.

6. The method according to claim 4, wherein said display controlling step further comprises a step of reading the to be displayed video data from the one of the two video memories to the screen for display at any time irrespective of the opening/closing of the eyelids when rewriting only a part of the screen.

7. The method according to claim 6, wherein said display controlling step further comprises a step of reading the to-be-displayed video data from the one of the two video memories to the screen for display during the eyelid-closed state only when rewriting the whole screen.

8. The method according to claim 1, wherein said image processing step comprises an edge extracting step of generating a facial edge image by extracting edges of the facial image information.

9. The method according to claim 8, wherein said edge extracting step comprises a step of performing a spatial differential process on the facial image information to obtain the facial edge image.

10. The method according to claim 9, wherein said image processing step further comprises a step of determining the eyelid opening/closing state by detecting at least one of a shape and a size of an iris part of an eye of the face from the facial edge image.

11. The method according to claim 8, wherein said image processing step further comprises an image cutout step of cutting out an edge image of an eye-part segmented area from the facial edge image.

12. The method according to claim 8, wherein said image processing step further comprises a blink detecting step of detecting an eyelid opening/closing state from the facial edge image.

13. The method according to claim 12, wherein said blink detecting step comprises a step of detecting a blink at a proper timing by writing and reading the facial image information to be processed through an alternate use of two image memories.

14. The method according to claim 1, wherein said image processing step comprises a step of detecting the opening/closing state of the eyelids by intermittently processing the facial image information in a period shorter than an eyelid-closed period due to blinking.

15. An apparatus, run by an operator, for displaying an image formed by video data, said apparatus comprising:
   displaying means, including a screen, for sequentially displaying video data on the screen;
   imaging means for imaging at least a face of the operator to generate facial image information;
   image processing means for detecting opening and closing of eyelids of the operator based on the facial image information;
   signal generating means for generating a rewrite signal which indicates rewriting of the video data displayed on the screen; and
   display controlling means for performing a principal change of the video data displayed on the screen by said displaying means when the rewrite signal is generated by said signal generating means and when the operator fails to look at the screen on the basis of the eyelid opening/closing state obtained by said image processing means.

16. The apparatus according to claim 15, wherein:
   said imaging means further comprises means for generating the facial image information in a period at least as short as a period for which the eyelids are closed by blinking; and
   said image processing means comprises means for detecting the opening and closing of the eyelids in a period at least as short as the eyelid-closed period.

17. The apparatus according to claim 15, wherein said display controlling means comprises means for rewriting the displayed video data in a substantially-closed state of the eyelids of the operator.

18. The apparatus according to claim 15, wherein said display controlling means comprises:
   two video memories for alternately storing change video data, which is the video data to replace the video data displayed on the screen; and
   means for rewriting the displayed video data at a proper timing by writing the change video data to one of the two video memories and reading to-be-displayed video data, which is the change video data already written into the two video memories, from the other one of the two video memories to the displaying means.

19. The apparatus according to claim 18, wherein said display controlling means further comprises means for reading the to-be-displayed video data from the one of the two video memories to the screen for display during an eyelid-closed state only in case of rewriting the whole screen.

20. The apparatus according to claim 18, wherein said display controlling means further comprises means for reading the to-be-displayed video data from the one of the two video memories at any time irrespective of the opening/closing of the eyelids in case of rewriting only a part of the screen.

21. The apparatus according to claim 20, wherein said display controlling step further comprises means for reading the to-be-displayed video data from the one of the two video memories to the screen for display during the eyelid-closed state only in case of rewriting the whole screen.

22. The apparatus according to claim 15, wherein said image processing means comprises edge extracting means for generating a facial edge image by extracting edges of the facial image information.

23. The apparatus according to claim 22, wherein said edge extracting means comprises means for obtaining the facial edge image by performing a spatial differential process on the facial image information.

24. The apparatus according to claim 23, wherein said image processing step further comprises means for determining opening/closing state of the eyelids by detecting at least one of a shape and a size of an iris part of an eye of the face from the facial edge image.

25. The apparatus according to claim 22, wherein said image processing means further comprises image cutout means for cutting out an edge image of an eye-part segmented area from the facial edge image.

26. The apparatus according to claim 22, wherein said image processing means further comprises blink detecting means for detecting an eyelid opening/closing state from the facial edge image.

27. The apparatus according to claim 26, wherein said blink detecting means comprises:
   two video memories for storing the facial edge image to be processed; and
   means for detecting a blink at a proper timing by writing and reading the facial edge image to be processed through an alternate use of two video memories.

28. The apparatus according to claim 15, wherein said image processing means comprises means for detecting the opening/closing state of the eyelids by intermittently processing the facial image information in a period shorter than an eyelid-closed period due to blinking.

29. A method of displaying an image formed by video data on a screen and viewed by an operator, said method comprising:
   a displaying step of sequentially displaying the video data on the screen;
   an image inputting step of inputting facial image information of a face of the operator;
   an image processing step of detecting opening and closing of eyelids of the operator based on the image information of the face, said image processing step having,
   an edge extracting step of generating a facial edge image by extracting edges of the facial image information, said edge extracting step obtaining the facial edge image by effecting a spatial differential process on the facial image information; and
   a display controlling step of performing a principal change of the video data displayed on the screen when the operator fails to look at the screen on the basis of the eyelid opening/closing state obtained by said image processing step.

30. The method according to claim 29, wherein said image processing step further comprises a step of determining the eyelid opening/closing state by detecting at least one of a shape and size of an iris part of an eye of the face from the facial edge image.

* * * * *

UNITED STATES PATENT AND TRADEMARK OFFICE
CERTIFICATE OF CORRECTION

PATENT NO. : 5,455,601
DATED : October 3, 1995
INVENTOR(S) : Ozaki

It is certified that error appears in the above-indentified patent and that said Letters Patent is hereby corrected as shown below:

Col. 1, line 31, delete "almost";
      line 42, change "teems" to --terms--.
Col. 3, line 18, after "of" insert --,--;

Col. 5, line 40, delete "for";
      line 62, after "signal" delete "'".
Col. 6, line 32, change "3'3" to --3x3--.
Col. 9, line 61, delete ",".

Signed and Sealed this

Ninth Day of January, 1996

*Attest:*

BRUCE LEHMAN

*Attesting Officer*     Commissioner of Patents and Trademarks